United States Patent
Wong

(10) Patent No.: US 11,027,862 B2
(45) Date of Patent: Jun. 8, 2021

(54) COLD BLOW-FILL-SEAL PACKAGING SYSTEM AND PROCESS

(71) Applicant: Woodstock Sterile Solutions, Inc., Woodstock, IL (US)

(72) Inventor: Waiken K. Wong, Oak Park, IL (US)

(73) Assignee: Woodstock Sterile Solutions, Inc., Woodstock, IL (US)

( * ) Notice: Subject to any disclaimer, the term of this patent is extended or adjusted under 35 U.S.C. 154(b) by 499 days.

(21) Appl. No.: 14/746,159

(22) Filed: Jun. 22, 2015

(65) Prior Publication Data

US 2015/0367969 A1    Dec. 24, 2015

Related U.S. Application Data

(60) Provisional application No. 62/015,822, filed on Jun. 23, 2014.

(51) Int. Cl.
| | |
|---|---|
| *B65B 3/04* | (2006.01) |
| *B65B 3/02* | (2006.01) |
| *B65B 3/00* | (2006.01) |
| *B65B 3/10* | (2006.01) |
| *B65B 39/00* | (2006.01) |
| *B29C 49/04* | (2006.01) |

(52) U.S. Cl.
CPC .............. *B65B 3/022* (2013.01); *B65B 3/003* (2013.01); *B65B 3/10* (2013.01); *B29C 49/04* (2013.01); *B65B 3/04* (2013.01); *B65B 2039/009* (2013.01); *B65B 2220/16* (2013.01)

(58) Field of Classification Search
CPC .. B65B 3/022; B65B 3/04; B65B 7/28; B65B 2220/16; B65B 2039/009; B29C 49/04
USPC ...................................................... 53/453, 561
See application file for complete search history.

(56) References Cited

U.S. PATENT DOCUMENTS

| | | | |
|---|---|---|---|
| 3,460,198 A | * | 8/1969 | Dietz ..................... B29C 49/04 |
| | | | 425/306 |
| 5,169,470 A | | 12/1992 | Goldberg |
| 5,936,039 A | * | 8/1999 | Wang ..................... C08L 23/02 |
| | | | 525/133 |
| 5,962,039 A | | 10/1999 | Katou et al. |
| (Continued) | | | |

FOREIGN PATENT DOCUMENTS

| | | |
|---|---|---|
| DE | 2924814 A1 | 1/1981 |
| JP | S60251089 A | 12/1985 |
| (Continued) | | |

OTHER PUBLICATIONS

Kram, T. et al., "New BFS Machine Developments," BFS IOA Meeting, Boston Oct. 2013, pp. 1-37.

(Continued)

*Primary Examiner* — Anna K Kinsaul
*Assistant Examiner* — Chinyere J Rushing-Tucker
(74) *Attorney, Agent, or Firm* — Mendelsohn Dunleavy, P.C.

(57) ABSTRACT

A method and system for cold blow-fill-seal packaging of a product. The method and system are directed to maintaining a relatively cold temperature of the product to be packaged during the flow-fill-seal process. This accomplished via the use of one or more of, for example, a heat-exchanger in the system, insulated flow lines and steps taken during the procedure to maintain the temperature of the product below a certain level.

14 Claims, 4 Drawing Sheets

(56) References Cited

U.S. PATENT DOCUMENTS

| | | | |
|---|---|---|---|
| 6,214,282 B1* | 4/2001 | Katou | B65B 3/022 |
| | | | 264/163 |
| 6,638,476 B1* | 10/2003 | Elias | B65B 55/103 |
| | | | 134/107 |
| 2004/0156942 A1* | 8/2004 | Schulze Uphoff | B29C 49/66 |
| | | | 425/526 |
| 2009/0200191 A1 | 8/2009 | Matsuda et al. | |
| 2010/0262114 A1* | 10/2010 | Brandenburger | B29B 11/14 |
| | | | 604/403 |
| 2011/0108018 A1* | 5/2011 | Heinsohn | F24D 11/003 |
| | | | 126/585 |
| 2011/0109018 A1 | 5/2011 | Parrinello et al. | |
| 2011/0154785 A1* | 6/2011 | Stolte | B29C 49/64 |
| | | | 53/452 |
| 2012/0061884 A1* | 3/2012 | Maki | B29C 49/4268 |
| | | | 264/529 |
| 2013/0255827 A1 | 10/2013 | Colangelo | |
| 2014/0318083 A1* | 10/2014 | Marastoni | B29C 49/06 |
| | | | 53/453 |
| 2014/0348700 A1* | 11/2014 | Foreman | A61L 2/24 |
| | | | 422/3 |
| 2014/0352260 A1* | 12/2014 | Pinna | B65B 63/08 |
| | | | 53/440 |
| 2015/0190960 A1* | 7/2015 | Chauvin | B29C 49/4289 |
| | | | 426/397 |
| 2015/0239594 A1* | 8/2015 | Batema | B65B 55/10 |
| | | | 53/426 |
| 2015/0367969 A1 | 12/2015 | Wong | |

FOREIGN PATENT DOCUMENTS

| | | |
|---|---|---|
| JP | H08198204 A | 8/1996 |
| JP | H09057834 A | 3/1997 |
| JP | H10180854 A | 7/1998 |
| JP | 2008018968 A | 1/2008 |
| JP | 2011520643 A | 7/2011 |
| WO | WO9726126 A1 | 7/1997 |
| WO | WO2009127962 A2 | 10/2009 |

OTHER PUBLICATIONS

Spallek, M. et al., "Heat Effects on Sensitive Formulations During Blow-Fill-Seal Processing," BFS IOA European meeting, 2014, pp. 1-37.

International Search Report and Written Opinion; dated Sep. 24, 2015 for PCT Application No. PCT/US2015/037089.

European Search Report; dated Dec. 22, 2017 for EP Application No. EP 15812867.8.

AU Examination Report; dated Mar. 5, 2019 for AU Application No. 2015280215.

European Office Action; dated Nov. 14, 2018 for EP Application No. EP 15812867.8.

Non Final Office Action for Japanese Application No. JP2016-575189, dated Apr. 23, 2019.

Notice of Reasons for Rejection for corresponding Japanese application No. 2016-575189; dated Dec. 3, 2019 (7 pages).

Communication of Notice of Opposition for corresponding European application No. 15812867.8; dated Jan. 19, 2021 (36 pages).

Liu, Wei et al., "Biopharmaceutical Manufacturing Using Blow-Fill-Seal Technology", BioPharm International 24.7 (2011): 22-29.

Spallek, Michael W., et al. "Heat effects on sensitive formulations during blow-fill-seal processing", Presentation; Connecting People, Science and Regulation (Mar. 2014): 1-20.

"2014 PDA Europe Parenteral Packaging", Conference Brochure; Parenteral Drug Association (Mar. 2014): 18 pages.

Spallek, Michael, Confirmation of participation in PDA Europe Parenteral Packaging Conference (2020): 1 page.

* cited by examiner

COLD BLOW-FILL-SEAL PACKAGING SYSTEM AND PROCESS

RELATED APPLICATION DATA

This application claims the benefit of U.S. Provisional Application No. 62/015,822, filed on Jun. 23, 2014, the contents of which are herein incorporated by reference.

BACKGROUND OF THE INVENTION

1. Field of the Invention

The present invention is directed to the field of packaging products. In particular the field of the invention is directed to blow-fill seal packaging of heat sensitive products.

2. Description of the Related Technology

Blow-fill-seal (BFS) packaging is a process involving an extruded resin, such as polyethylene (PE) or polypropylene (PP) blown in a sterile and pyrogen-free state into a mold shaped in the desired form of a container. Following the formation of a container, the container cools and is then filled with a product and sealed.

The heat required and the temperatures reached during the container forming stage of BFS packaging poses significant risks to heat-sensitive products, such as biologics. Biologics are medicinal products manufactured in or extracted from biological sources. Examples of biologics include vaccines, blood or blood components, allergenics, somatic cells, gene therapies, tissues, recombinant therapeutic protein and living cells. Heat sensitive products are subject to denaturing and/or subject to precipitation in the event that such products become too warm. In the packaging process, it is important to maintain a balance between the heat involved in the process so as not to damage the product that is filling the container and carrying out the packaging at a temperature sufficient to ensure the proper formation of the container.

SUMMARY OF THE INVENTION

The present invention is directed to a method and system for cold blow-fill-seal packaging.

An aspect of the present invention is a method for cold blow-fill-seal packaging comprising the steps of heating a product, forming the container, filling the container with the heated product more than one second after the forming step, and sealing the container.

Another aspect of the present invention is a method for cold blow-fill-seal packaging comprising the steps of forming a container, providing a product to the formed container more than one second after the container has been formed and sealing the container.

Another aspect of the invention is a system for cold blow-fill-seal packaging comprising a blow-fill-seal machine, a holding tank for holding a product, a flow line through which the product moves from the holding tank to a blow-fill seal machine. Additionally, the system comprises a heat exchanger connected operatively located between the holding tank and the blow-fill-seal machine for heating the product, wherein the system is adapted to feed the heated product to the blow-fill-seal machine more than one second after forming a container.

DETAILED DESCRIPTION OF THE PREFERRED EMBODIMENTS

For illustrative purposes, the principles of the present disclosure are described by referencing various exemplary embodiments. Although certain embodiments are specifically described herein, one of ordinary skill in the art will readily recognize that the same principles are equally applicable to, and can be employed in other systems and methods.

Before explaining the disclosed embodiments of the present disclosure in detail, it is to be understood that the disclosure is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in any order as may be appreciated by one skilled in the art; the novel methods are therefore not limited to the particular arrangement of steps disclosed herein.

It must be noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

As discussed above, in the packaging process, it is important to maintain a balance between reducing the heat involved in the process to maintain product quality attributes and not reducing the heat so much that it interferes with proper container formation. In order to obtain this balance various strategies involving active and passive cooling of products during transfer and holding of the product may be used. Additionally, adjustments to the blow-fill-seal (BFS) parameters may be employed. Such strategies may include the introduction of more robust cooling in the fill system and rapid cooling mechanisms for formed containers prior to filling them with product. Also, molds may be used that are able to isolate cold regions of the container where the product has been filled from hot regions of the container/parison that still require relatively higher temperatures to complete container sealing. The present invention is directed to a system and method that is able to permit formation of good quality containers while preventing problems with the product that may be caused by excessive heating during packaging.

Figure 1:
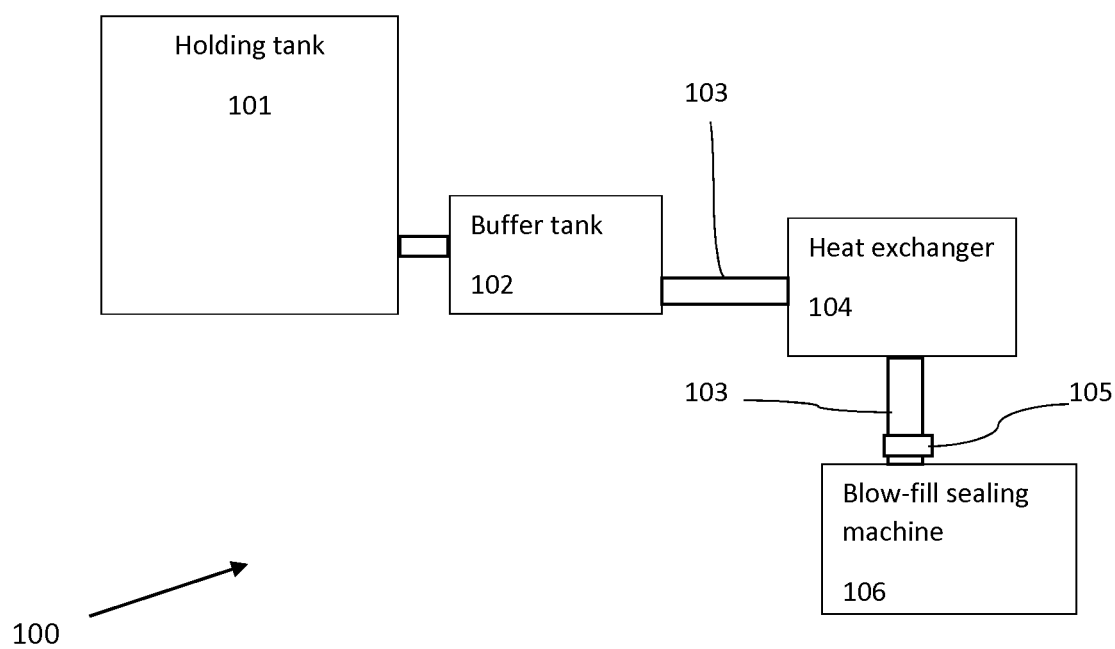
FIG. 1 shows a diagram of a cold blow-fill-seal system according to an embodiment of the present invention.

FIG. 1 shows a cold BFS system 100 in accordance with an embodiment of the invention. As shown in FIG. 1, the cold BFS system 100 comprises a holding tank 101, a buffer tank 102, a flow line 103, a heat exchanger 104, a thermocouple 105 and a blow-fill-seal (BFS) machine 106.

Holding tank 101 holds the manufactured product prior to filling product containers. The product held in holding tank 101 may be any type of product, however the system is intended for use with products that need to be kept at or below a predetermined temperature in order to prevent the product from denaturing and/or forming a precipitate. The product is typically in liquid form and is capable of being placed into a container by a BFS machine. In particular, the product may be a biologic. Holding tank 101 may be any suitable holding tank, such as a stainless steel tank dimensioned according to specifications. Holding tank 101 is adapted to hold the product at a relatively cool temperature of between about 0° C. to about 20° C. In some embodiments, holding tank 101 may hold the product at temperatures that are higher or lower, depending on the requirements of a particular product.

Buffer tank 102 is located proximate to holding tank 101 and functions to hold a reduced amount of product prior to movement of the product through flow line 103. Buffer tank 102 typically holds a smaller amount of the product so as to be able to build pressure to move the product through flow line 103. Product may be moved from holding tank 101 through flow line 103 to BFS machine 106 by the use of pressurized gas. It is further contemplated that product may be moved via the use of other conventional means for product movement such as pumps, etc.

Flow line 103 connects holding tank 101 to BFS machine 106. Flow line 103 is preferably insulated in order to maintain the product at a relatively constant temperature as it travels through flow line 103. Insulation material used for flow line 103 may be, for example, silicone rubber sheathing, or a fiberglass wrap. Flow line 103 may have a Teflon interior contact surface.

Heat exchanger 104 may be located along flow line 103. Heat-exchanger 104 can comprise more than one pipe. In an embodiment of the present invention there is an inside pipe and an outside pipe that together form heat exchanger 104. The outside pipe surrounds the inside pipe and both pipes are able to carry fluids. The outside pipe preferably carries a coolant, while the inside pipe preferably carries the product and is connected at both ends to flow line 103. The coolant flowing through the outside pipe maintains the temperature of the product when flowing in the inside pipe. For cooling product down to about 15° C. recirculating chilled water may be used as the heat exchange medium. If a colder temperature is desired a 50% ethylene glycol solution may be used as the heat exchange medium. Heat exchanger 104 may have different flow arrangements. In the embodiment shown in FIG. 1, heat exchanger 104 is a counter-flow heat exchanger in which the fluids enter the heat exchanger 104 from opposite directions. Other flow arrangements for heat exchanger 104 may be used including parallel-flow heat exchangers, where two fluids enter the heat exchanger 104 at the same end, and travel in parallel to one another through heat exchanger 104. The counter-flow heat-exchanger 104 is the most efficient, in that it can transfer the most heat per the average temperature difference along a unit length. In an embodiment of the present invention, heat exchanger 104 may be of the type made by Exergy In the cold BFS system 100 shown in FIG. 1, a thermocouple 105 is shown located along flow line 103, proximate to BFS machine 106. Thermocouple 105 is used in the embodiment shown in order to monitor the temperature of the product prior to entering into BFS machine 106. In the cold BFS system 100, thermocouple 105 is located less than a meter from the BFS machine 106. It is possible to locate the thermocouple 105 closer or further away from the BFS machine 106 depending on the arrangement of component parts of the particular cold BFS system 100. Thermocouple 105 may be a T-type thermocouple made by Omega. It is contemplated that in some cold BFS systems 100, a thermocouple will not be used.

BFS machine 106 shown in FIG. 1 is intended to be a standard BFS machine such as those built by Weiler Manufacturing. BFS machine 106 is adapted to form the container into which the product is filled. A mold in the BFS machine 106 closes around a comparatively hot parison material to form the container. The hot parison material needs to cool in a certain manner known to skilled persons in order to avoid formation of defects in the finished container. After formation of the container, BFS machine 106 inserts a nozzle into the container in order to fill the container with product.

Figure 2:
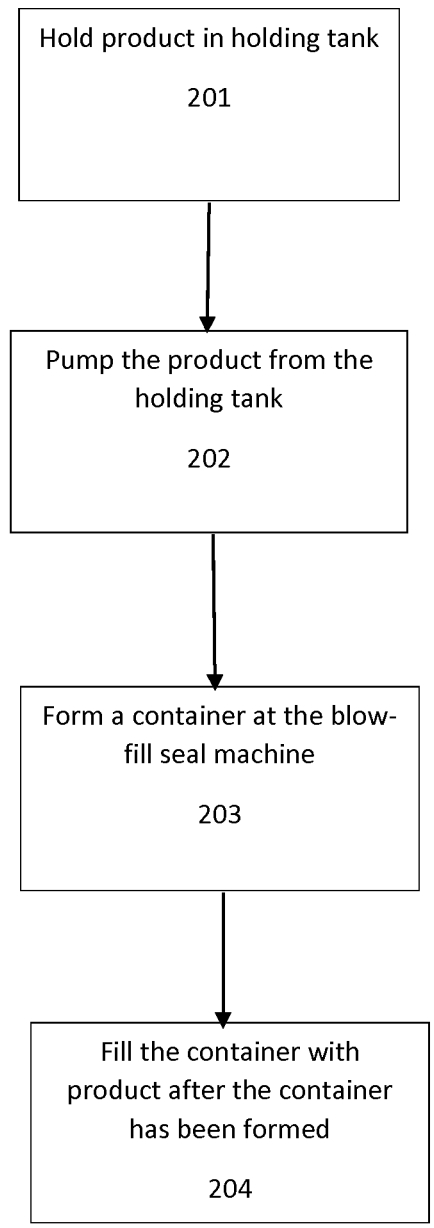
FIG. 2 shows a flow chart of a method for cold blow-fill-seal in accordance with an embodiment of the present invention.

FIG. 2 shows a flow chart of a method for a cold blow-fill-seal process in accordance with an embodiment of the present invention. The method shown in FIG. 2 and discussed herein may be used with the system 100 described and discussed in relation to FIG. 1 and thus is discussed herein in the context of being carried out in the system 100.

In step 201, a product is held in a tank, such as holding tank 101 discussed above. The product is held in the holding tank 101 until it is ready to be transferred to BFS machine 106. The product held in the holding tank 101 may be in a state ready for final packaging or in some embodiments may be heated and/or transferred to other tanks, e.g. buffer tank 102, in order to undergo further mixing or processing, before being fed to BFS machine 106.

In step 202, the product is moved from holding tank 101 using, for example, a pressurized gas. The product may be moved from the holding tank 101 to a buffer tank 102 (or surge tank) before being transferred to flow line 103. Once transferred from the holding tank 101 into the flow line 103, the product traverses the system to the BFS machine 106. As discussed above, preferably the flow line 103 is insulated in order maintain the product at a temperature cold enough to prevent denaturing and/or precipitate formation. Furthermore, in the preferred embodiment the product moves through a heat-exchanger 104 in addition to the flow line 103 in order to maintain the temperature of the product or heat the product.

In step 203, a container is formed in BFS machine 106. During the formation of the container, the mold closes around the parison material that is to be used to form the container.

In step 204, BFS machine 106 fills the formed container with product. Prior to filling the container, the product may remain for a residence time in flow line 103. Only when the filling step actually takes place, which filling typically occurs over period of about 0.5-1.5 seconds out of a 12-15 second overall blow-fill-seal cycle, is the product moving. During the process, as the product sits in BFS machine 106, the product's temperature equilibrates with its surroundings. For product that has made its way into the fill system, which may be uninsulated and has no temperature control mechanisms, the product will equilibrate itself to the temperature of the fill system. However, in some embodiments the fill system may employ any conventional cooling mechanism.

Every fill cycle is generally between about 12-15 seconds from start to finish. In the method described herein, the BFS machine 106 waits a longer than normal time in order to fill the container after container formation (i.e. before insertion of a nozzle). This is done to accomplish two goals. First, waiting longer allows the container to form more completely, thus substantially avoiding the formation of defects. Second, waiting longer prior to filling the container with the product prevents the product from warming too much when it comes into contact with the recently formed container. In the present embodiment of the invention, the wait from the time of container formation to the time of insertion of the filling nozzle is greater than one second, and preferably between two to five seconds. Waiting longer than necessary may delay the overall process and slow down production times. It has been found that the advantage of inserting this additional waiting time into the process outweighs the corresponding loss of production due to the delay by ensuring that the filled product is not adversely affected by heating during the container filling process. It is important to maintain a balance between preventing product degradation the amount of containers that can be filled in a given time period.

Figure 3:
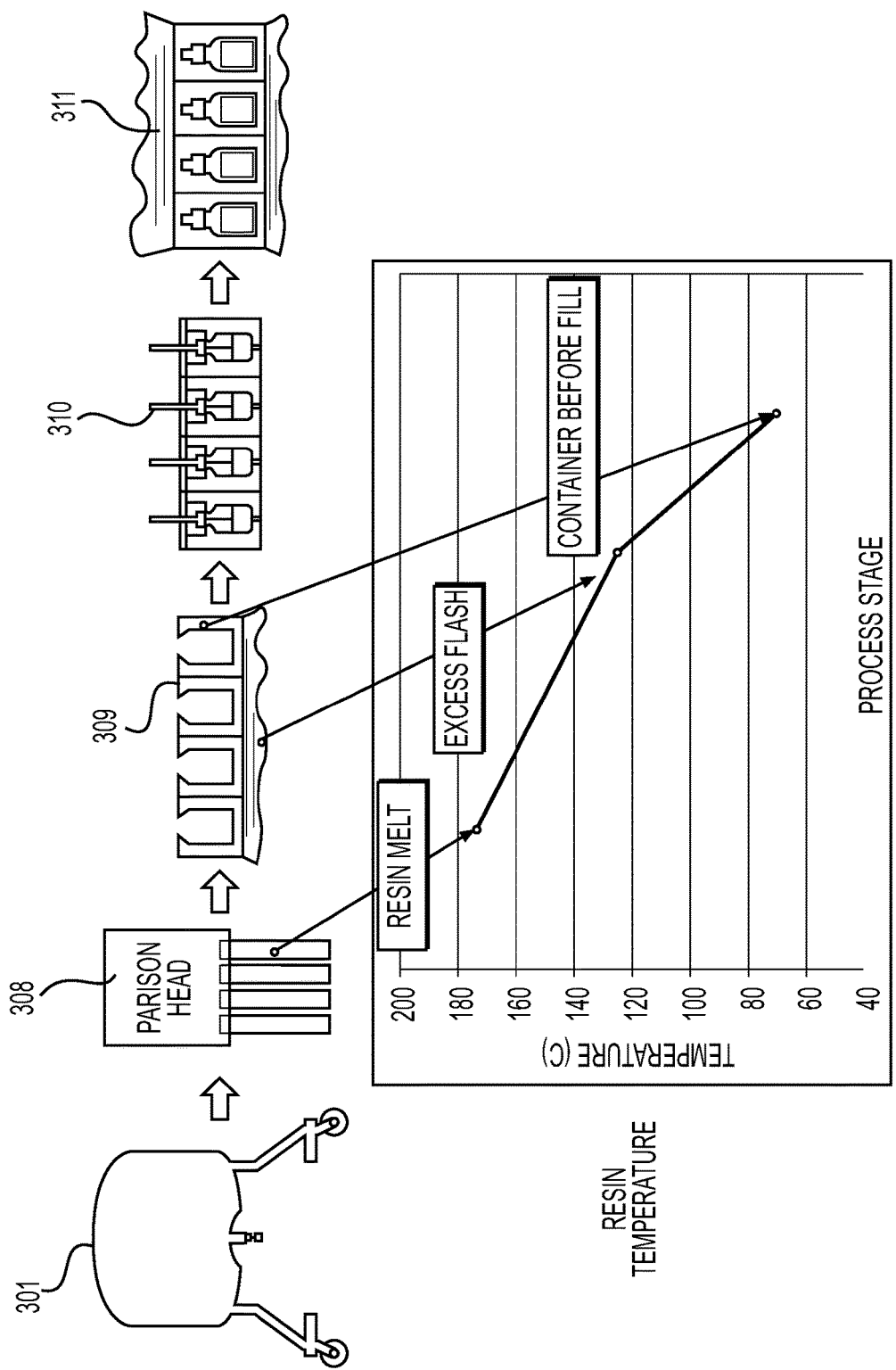
FIG. 3 shows a diagram representing temperatures of a container prior to being filled with a product.

The cold BFS system 100 and method of cold BFS container manufacture were studied in order to determine the temperatures that occur during the process. FIG. 3 shows a diagram representing the temperatures of a container in the cold BFS system 100 prior to being filled with a product. The diagram includes representations of various stages in the cold BFS method. Holding tank 301 represents the stage in the method when the product is held, parison head 308 represents the stage in the method when the parison is extruded, and mold 309 represents the stage in the process in which the mold closes around the parison and forms the container. Nozzle 310 represents the stage of the process at which product is filled into the container. Fully formed containers 311 represent the stage at which the containers are complete and ready for downstream deflashing (removal of excess material around the containers), secondary packaging, storage, and shipping.

FIG. 3 shows the temperature of the melted resin used to form the container. The temperature of the resin melt is between about 160° C. to about 180° C. at the stage in the method during which the parison is extruded. After the mold closes around the parison and the container is formed, temperatures of the flash (i.e. excess material formed during the molding process) are between about 120° C. to about 140° C. Prior to filling the container with the product, the container temperature is between about 60° C. to about 80° C. This temperature impacts the product used to fill the container and affects the overall heat. It should be understood that the actual observed temperatures may vary from these ranges depending on the processing requirements of the resin being used. These ranges merely represent typical temperatures that can occur during the formation of the container.

Figure 4:
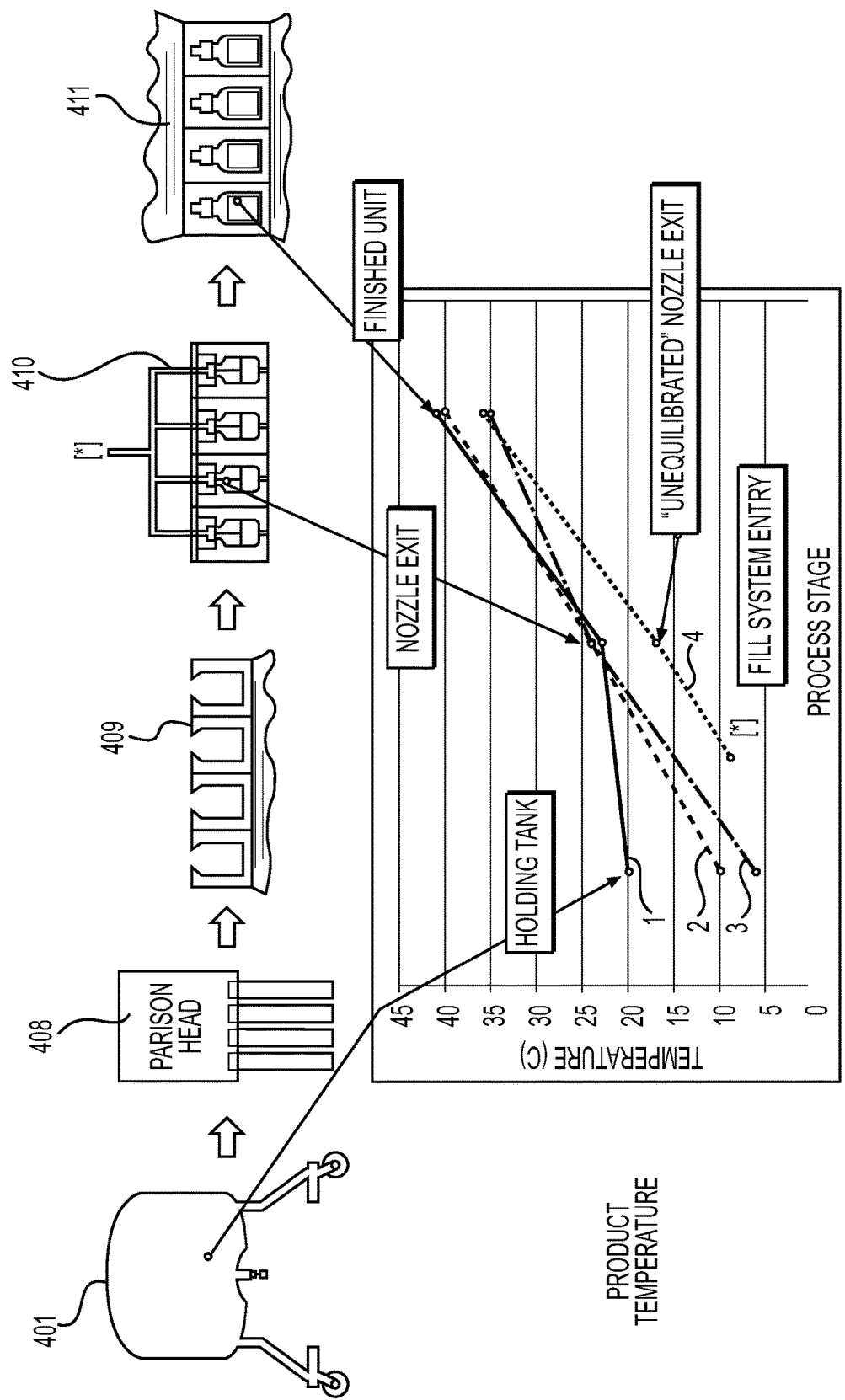
FIG. 4 shows a diagram representing temperatures of a product at various points throughout the manufacturing process.

FIG. 4 shows a diagram representing the temperatures of at various points during packaging. Similar to what is shown in FIG. 3, holding tank 401 represents the stage in the method when the product is held, parison head 408 represents the stage in the method when the parison is extruded, and mold 409 represents the stage in the method at which the mold closes around the parison and forms the container. Nozzle 410 represents the stage in the method at which product is filled into the container. Fully assembled package 411 represents the stage at which the containers are complete and ready for downstream deflashing, secondary packaging, storage, and shipping.

FIG. 4 has four different lines to illustrate the temperatures that have been observed when attempting to control the temperature of the product that is filled into the container. Line 1 represents a standard fill procedure with no temperature control and the temperatures occurring during that procedure. Generally speaking the product is at a temperature of about 20° C. when in the holding tank and a temperature of about 25° C. when the product exits the nozzle and is filled into the container. The finished product is at a temperature of about 40° C., or less than 40° C., or less than 38° C., or less than 36° C. or about 35° C.

Line 2 represents the temperatures of the product when the product is held and released from a holding tank 401. In Line 2 the product is held at a temperature below about 15° C., and preferably between about 5° C. and about 10° C., when in the holding tank 401. Line 2 illustrates that when the product exits the nozzle and is filled into the molded container, there is not a major difference between initiating the process with the product at a lower temperature than initiating the process with the product at a standard temperature.

Line 3 illustrates the effects of chilling when used in system 100. By having insulated flow lines, the product is able to traverse the system at temperatures that are colder that would otherwise be the case. Ultimately, a packaged product is able to be obtained at a product temperature of about 35° C. using this process.

Line 4 shows the temperature range of a product when traversing through a system 100 as set forth and described above with respect to FIG. 1 and in accordance with the method set forth and described in FIG. 2. In this instance the product entered the BFS machine at a temperature below about 10° C. By waiting, the container was capable of being filled at a temperature between 15-20° C. The product exit temperature from the "unequilibrated" nozzle exit is the temperature of the product prior to warming due to ambient temperatures. A finished, packaged product having a temperature of about 35° C. was obtained by this method.

It should be understood that the observed temperatures in FIG. 4 may vary depending on the processing requirements of the resin being used. These ranges merely represent typical temperatures that can occur during the formation of the container. In general these temperatures also reflect the range of temperatures that occur during movement and packaging of the product.

The system and method in accordance with the invention is able to keep the product at a lower temperature for a longer duration than previous, comparative methods. This results in fewer defects in the finished packaged product, as well as being able to maintain the same standard of quality of the container.

Although the invention has been described using relative terms such as "down," "out," "top," "bottom," "over," "above," "under" and the like in the description and in the claims, such terms are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Unless stated otherwise, terms such as "first" and "second" are used to arbitrarily distinguish between the elements such terms describe. Thus, these terms are not necessarily intended to indicate temporal or other prioritization of such elements. Further, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

It is to be understood, however, that even though numerous characteristics and advantages of the present invention have been set forth in the foregoing description, together with details of the method, composition and function of the invention, the disclosure is illustrative only, and changes may be made in detail, within the principles of the invention to the full extent indicated by the broad general meaning of the terms in which the appended claims are expressed.

What is claimed is:

1. A method for blow-fill-seal packaging in a blow-fill-seal machine of a heat sensitive product that is subject to denaturing and/or precipitation in the event that the product becomes too warm, said method comprising steps of:
   forming a container to provide a formed container in a mold of the blow-fill-seal machine;
   cooling the formed container to a container temperature between 60° C. to 80° C., said cooling step consisting of waiting a duration of from more than one second to about 5 seconds from when the container is formed, filling the formed container with the product after the cooling step, and wherein the container is at a temperature between 60° C. to 80° C. at the start of the filling step and the product employed in the filling step has a temperature between about 0° C. to about 20° C. and immediately after filling the formed container, has a temperature no greater than 40° C.; and
   sealing the container;
   wherein the blow-fill-seal (BFS) packaging is a packaging in which in a sterile and pyrogen-free state, formation of a container by blowing an extruded resin, filling of a product in the formed container and sealing of the container are carried out by means of a single mold.

2. The method of claim 1, wherein the product is passed through a heat-exchanger prior to said filling step.

3. The method of claim 2, wherein the heat exchanger is a counter-current heat exchanger.

4. The method of claim 1, wherein the waiting step has a duration of from about 2 to about 5 seconds from when the container is formed.

5. The method of claim 1, wherein the product, immediately after filling the formed container, has a temperature of about 40° C.

6. The method of claim 1, wherein the product, immediately after filling the formed container, has a temperature of less than about 40° C.

7. The method of claim 1, wherein the product, immediately after filling the formed container, has a temperature of less than about 38° C.

8. The method of claim 1, wherein the product, immediately after filling the formed container, has a temperature of less than about 36° C.

9. The method of claim 1, wherein a resin melt parison used to form the container is extruded at a temperature of between about 160° C. to 180° C.

10. The method of claim 9, wherein a flash formed when the mold closes around the parison is at a temperature between about 120° C. to 140° C.

11. A system for cold blow-fill-seal packaging of a heat sensitive product that is subject to denaturing and/or precipitation in the event that the product becomes too warm, said system comprising:
   a holding tank for holding the heat sensitive product that is subject to denaturing and/or precipitation in the event that the product becomes too warm; and
   a blow-fill-seal machine adapted to:
     (a) form a container in a mold of the blow fill seal machine to provide a formed container in the mold;
     (b) cool the formed container in the mold to a temperature between 60° C. to 80° C., by a cooling step consisting of waiting for more than one second to about five seconds once the container is formed, and
     (c) fill the heat sensitive product into the formed container having the temperature between 60° C. to 80° C. in the mold after cooling the formed container to the temperature between 60° C. to 80° C., and wherein the product, immediately after filling has a temperature no greater than 40° C.; and
     (d) seal the container;
   wherein the blow-fill-seal (BFS) machine is a machine in which in a sterile and pyrogen-free state, formation of the container by blowing an extruded resin, filling of the product in the formed container and sealing of the container are carried out by means of a single mold.

12. The system of claim 11, further comprising a buffer tank located between the holding tank and the blow-fill-seal machine and fluidly connected to the flow line.

13. The system of claim 11, wherein the heat exchanger is a counter-flow heat exchanger.

14. The system of claim 11, wherein the flow line is insulated.

\* \* \* \* \*

UNITED STATES PATENT AND TRADEMARK OFFICE
CERTIFICATE OF CORRECTION

Page 1 of 1

PATENT NO. : 11,027,862 B2
APPLICATION NO. : 14/746159
DATED : June 8, 2021
INVENTOR(S) : Wong It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 585 days.

Signed and Sealed this
Eleventh Day of February, 2025

Coke Morgan Stewart
*Acting Director of the United States Patent and Trademark Office*